(12) United States Patent
Counson (10) Patent No.: US 11,622,161 B2
(45) Date of Patent: Apr. 4, 2023

(54) METHOD FOR OPERATING A DISTRIBUTED VIDEO PRODUCTION SYSTEM AND ARCHITECTURE OF A DISTRIBUTED VIDEO PRODUCTION SYSTEM

(71) Applicant: EVS Broadcast Equipment SA, Seraing (BE)

(72) Inventor: Michel Counson, Seraing (BE)

(73) Assignee: EVS BROADCAST EQUIPMENT SA, Seraing (BE)

( * ) Notice: Subject to any disclaimer, the term of this patent is extended or adjusted under 35 U.S.C. 154(b) by 29 days.

(21) Appl. No.: 17/359,880

(22) Filed: Jun. 28, 2021

(65) Prior Publication Data
US 2021/0409837 A1    Dec. 30, 2021

(30) Foreign Application Priority Data

Jun. 29, 2020 (EP) .................................. 20182983

(51) Int. Cl.
*H04N 21/845* (2011.01)
*H04N 21/231* (2011.01)
(Continued)

(52) U.S. Cl.
CPC ....... *H04N 21/8455* (2013.01); *H04N 21/236* (2013.01); *H04N 21/238* (2013.01); *H04N 21/23106* (2013.01)

(58) Field of Classification Search
CPC ......... H04N 21/8455; H04N 21/23106; H04N 21/236; H04N 21/238; H04N 21/2187;
(Continued)

(56) References Cited

U.S. PATENT DOCUMENTS 8,456,571 B1 *  6/2013  Taylor ................. H04N 7/0122
                                                          348/445
9,407,944 B1 *  8/2016  Galdy ................ H04N 21/2402
(Continued)

FOREIGN PATENT DOCUMENTS

EP       3073741 A1    9/2016
EP       3232667 A1    10/2017

OTHER PUBLICATIONS

European Search Report for corresponding European Application No. 20182983, dated Dec. 9, 2020.
(Continued)

*Primary Examiner* — Thai Q Tran
*Assistant Examiner* — Stephen R Smith
(74) *Attorney, Agent, or Firm* — Meagher Emanuel Laks Goldberg & Liao, LLP (57) ABSTRACT

A new architecture of a distributed video production system is suggested. The distributed video production system enables distributed execution of one or more workflows that are operated by one or more operators at the same time. The present disclosure suggests mechanisms for synchronizing workflows and data streams within the distributed video production system. A workflow orchestrator is aware of all workflows currently executed on the distributed video production system and selects the required processing resources. A run time orchestrator ensures that the blocks are available for processing by controlling the receiving broadcast functionality such that it requests the block only after it is available by taking into account a network delay.

12 Claims, 5 Drawing Sheets

(51) Int. Cl.
  *H04N 21/236* (2011.01)
  *H04N 21/238* (2011.01)

(58) Field of Classification Search
  CPC . H04N 5/2224; H04N 5/2228; H04N 21/8547
  USPC ........................................................ 386/241
  See application file for complete search history.

(56) References Cited

U.S. PATENT DOCUMENTS

| | | |
|---|---|---|
| 2006/0156219 A1 | 7/2006 | Haot et al. |
| 2007/0127667 A1 | 6/2007 | Rachamadugu |
| 2010/0293027 A1 | 11/2010 | Du Fosse |
| 2015/0067019 A1* | 3/2015 | Balko .................... G06F 9/5038 709/202 |
| 2015/0172559 A1* | 6/2015 | Krug ...................... H04N 5/268 348/660 |
| 2015/0326632 A1* | 11/2015 | Lammers ................ H04L 65/60 709/231 |
| 2016/0330497 A1 | 11/2016 | Vanantwerp |
| 2017/0220499 A1* | 8/2017 | Gray ....................... G06F 13/36 |
| 2017/0244991 A1* | 8/2017 | Aggarwal .............. G06V 40/23 |
| 2019/0166386 A1* | 5/2019 | Barnich ................ H04N 21/234 |
| 2019/0313163 A1 | 10/2019 | Shen |
| 2020/0195360 A1 | 6/2020 | De Becker et al. |
| 2020/0393961 A1* | 12/2020 | Fletcher .............. G06F 3/04847 |
| 2021/0195252 A1* | 6/2021 | Rao ................... H04N 21/21805 |
| 2021/0360295 A1* | 11/2021 | Sze ....................... H04L 65/765 |

OTHER PUBLICATIONS

Keltsch et al, Remote Production and Mobile Contribution Over 5G Networks: Scenarios, Requirements and Approaches for Broadcast Quality Media Streaming, 2018 IEEE International Symposium on Broadband Multimedia Systems and Broadcasting (BMSB), IEEE, Jun. 6, 2018, pp. 1-7.

* cited by examiner

METHOD FOR OPERATING A DISTRIBUTED VIDEO PRODUCTION SYSTEM AND ARCHITECTURE OF A DISTRIBUTED VIDEO PRODUCTION SYSTEM

FIELD

The present disclosure relates to the architecture of a distributed video production system and a method for operating such a distributed video production system. The architecture is based on a plurality of video production devices including one or several physical video production servers, which are involved in a video production.

BACKGROUND

A broadcast production of a live event such as a sport event conventionally requires a lot of expensive specialized equipment for the acquisition, processing and play out or the audio and/or video feeds or streams coming from acquisition devices, such as cameras and microphones. Sometimes the video and/or audio feeds are combined with associated meta-data, for instance video/audio meta-data or meta-data associated with the event that is captured, such as the speed of athletes or situational data being supplied by experts, e.g. commentaries on sports games like goals, fouls, etc. All the incoming signals or data need to be processed to produce one or more final program output signal(s). The processing includes for example but not limited to:
- ingesting signals from acquisition devices into processing equipment;
- encoding raw signals from the acquisition devices into lower bit rate signals;
- deriving lower resolution copies of the original signal, e.g. for monitoring or other purposes;
- decoding the lower bit rate signals into the original raw signal;
- transcoding signals;
- recording a signal for later use;
- applying video effects (M/E) to signals;
- mixing different signals into a single signal;
- playing out of signals;
- displaying signals.

The entirety of the devices that are needed to make a broadcast production are globally referred to as broadcast equipment or video production devices.

A big portion of the necessary processing is performed by vision mixers and production servers. Vision mixers are available, e.g. from EVS. In a typical broadcast production vision mixers and production servers are connected with other devices such as cameras, video stores, video effect generators, and others. All these devices are commercially available but are very expensive. Regardless of the size of a of an event the production covering the event should be consistent with the production quality standard of the facilitating broadcast network. In consequence, the production cost, even of small events, e.g. at universities or football games between teams which are only popular in a small region, are comparatively high to realize the broadcast production.

EP 3 232 667 A1 addresses this problem by suggesting a software-based video production server that is integrated into a distributed video production system. The distributed video production system facilitates working with a small on-site team where the event takes place for capturing the event with one or several cameras. The video camera signals are ingested and transferred via a network to at least one video production server and/or a vision mixer to process the input signals and generate a broadcast output signal. Basic broadcast functionalities or elementary services such as storing, encoding, applying video effects (M/E functions), etc. are implemented as software modules. The software modules are mapped on hardware of the video production server on an as needed basis. The mapping of the software modules gives more flexibility in the dimensioning of the distributed video production system. For instance, the system includes only a single video production server for simple productions and two or more video production servers if the production is complex and needs a lot of signal processing.

Taking this as a starting point, there remains a desire for an even more flexible video production system while at the same time the look and feel for the user of the video production system remains essentially the same, compared to conventional video production systems.

SUMMARY

To this end, the present disclosure takes the approach proposed in EP 3 232 667 A1 one step further by a new architecture of the distributed video production system enabling distributed execution of one or more workflows that are operated by one or more operators at the same time. The workflows can include so-called remote workflows as defined further below. In other words: Depending on the needs for a particular video production, workflows include local workflows only, remote workflows only, or a mixture of local and remote workflows. The present disclosure suggests mechanisms for synchronizing workflows and data streams within the distributed video production system.

According to a first aspect the present disclosure suggests a method for operating a distributed video production system. The method comprises:
- receiving input video streams from video sources;
- assigning a timestamp to each video frame of every input video stream;
- defining a workflow comprising a concatenation of core broadcast functions for processing video streams;
- mapping each core broadcast function on a processing element within the video production system;
- determining a size of data blocks for transmission of video streams within the video production system to the processing elements associated with the workflow, wherein the data blocks contain video data;
- determining processing times of data blocks in each processing element associated with the workflow and transfer times of data blocks between processing elements when executing the workflow;
- transferring the input video streams in blocks of data to processing elements within the distributed video production system;
- synchronizing the processing elements to ensure that a data block is available for a receiving processing element when it is needed to perform synchronized processing between input video streams and at least one output video stream, wherein each processing element performs a core broadcast function.

The method provides for synchronized video production at the input and at the output of the distributed video production system like in any other conventional video production system. At the same time, data streams and workflows are distributed within the system to make the best use of the available hardware resources.

According to an advantageous embodiment the method further comprises receiving a user input defining an upper limit for an overall latency of the workflow and a number of transferable video streams within the workflow for determining and/or adapting the size of the data blocks. The size of the blocks is essential for the overall latency within the video production system. A user defines requirements for a broadcast production and the method automatically adapts the size of the data blocks to meet the requirements.

In one embodiment the step of adapting the size of the data blocks includes limiting occupation of transfer resources by ongoing transfers of other video streams. This embodiment addresses the problem that while the data block of a first video stream is transferred or stored, transfer or storage of any other video stream is inhibited.

Advantageously, the method further comprises storing the determined processing times and transfer times in a memory. The memory can be a lookup table or any other memory table. A run time orchestrator can fetch the processing times and transfer times from the memory to adapt the timing within the workflow for achieving a synchronized processing.

With advantage the method may further comprise assembling several small data blocks into a bigger hierarchical data block. When in one broadcast production a video stream has been stored in large blocks this can be disadvantageous in another broadcast production if that other broadcast production needs smaller data blocks. Hierarchical data blocks composed of several small data blocks solve that problem: Smaller data blocks from a hierarchical data block can be read out individually from a storage. The inverse process is also possible, i.e. small data blocks that have been stored individually can be read out as a big hierarchical data block that contains several of the previously stored small data blocks.

Therefore, the method may further comprise processing the small data blocks of a hierarchical data block individually.

According to a second aspect the present disclosure suggests a distributed video production system comprising:
  at least one video production server having a plurality of processing elements, wherein each processing element is configurable to execute a core broadcast function;
  an input device (102) for receiving input video streams, wherein the input device comprises an ingest module for assigning time stamps to each incoming data frame of the input video streams;
  a user interface enabling a user to compose a workflow comprising a concatenation of core broadcast functions, wherein each core broadcast function is mapped on one processing element;
  a workflow orchestrator determining a size of data blocks for transmission of video streams within the video production system to the processing elements associated with the workflow, wherein the data blocks contain video data;
  a run-time orchestrator for determining processing times of data blocks in each processing element associated with the workflow and transfer times of data blocks between processing elements when executing the workflow; wherein:
  the run time orchestrator synchronizes the processing elements to ensure that a data block is available for a receiving processing element when it is needed to perform synchronized processing between input video streams and at least one output video stream, wherein each processing element performs a core broadcast function.

Advantageously, the distributed video production system may comprise an asset management device enabling access to stored video streams. The asset management device provides convenient access to previously stored video streams for use in a new broadcast production.

It has been found useful to store processing times and transfer times associated with the workflow in a memory. The memory enables access to these data for synchronization purposes of the video production system.

In a useful further development, the distributed video production system comprises a plurality user interfaces for a plurality of users. Several users are enabled to work independently on broadcast productions on the same video production system without interfering with each other.

Advantageously, the processing elements are provided with a unified interface. The interface enabling an easy configuration and reconfiguration of the processing pipeline.

In a useful further development, the user interface is implemented as a graphical user interface because it provides a lot of flexibility and can easily be adapted to the preferences of the user.

In a preferred embodiment of the distributed video production system run-time and/or workflow orchestrator are hosted on one or several video production servers in the distributed video production system. The run-time and/or workflow orchestrator can be located on different machines permitting to efficiently use the available hardware resources.

Advantageously the distributed video production system is a software-based system.

BRIEF DESCRIPTION OF DRAWINGS

Exemplary embodiments of the present disclosure are illustrated in the drawings and are explained in more detail in the following description. In the figures the same or similar elements are referenced with the same or similar reference signs. It shows.

DETAILED DESCRIPTION

To begin with, several terms which will be used in the following shall be defined.

Distributed Video Production System

In a distributed video production system, the production resources forming the system are located at different physical locations. The different physical locations can be distributed locally in a studio, for instance, and can be remote from each other, e.g. in different cities. The distributed video production system is configured to execute one or a plurality of workflows.

Workflow

A workflow is a combination of broadcast functionalities resulting in a user—defined operation, such as generating a composed image including two camera streams and a video effect to create an interview situation of two people who are at different locations. A workflow is called a remote workflow if it is distributed in the distributed video production system, i.e. the remote workflow is executed at different locations. A workflow that is executed at a single location, for instance on a single server at a single site, is called a local workflow. A workflow that is executed by more than one server remains to be a local workflow if the transfer time of data between the servers for the video production is negligible, e.g. if the involved servers are located in the same studio in proximity to each other.

The workflows can be connected with each other or not. In connected workflows the output of one workflow is used as an input in another workflow. One or several local workflows can be connected with one or several remote workflows.

Broadcast Functionality

A broadcast functionality is a combination of core broadcast functions. The core broadcast functions are executed by one or more processing elements. Network resources are made available for exchanging audio and/or video signals between the processing elements.

Core Broadcast Function

A core broadcast function is a video processing function executed by one or more processing elements. The processing elements process an input stream to generate an output stream, wherein the streams contain audio and/or video signals. Examples of basic broadcast functions are storing, encoding, performing a mixing effect etc.

Processing Element

A processing element is a piece of hardware, for example a central processing unit (CPU) or a graphical processing unit (GPU) or a portion of it. It depends on the nature and complexity of the processing element on what kind of hardware it is mapped. The processing element is the physical basis to perform a core broadcast function. In addition to that, the processing element includes an I/O module.

I/O Module

An I/O module is an input/output module that ensures communication between processing elements and a network ensuring communication between the processing elements. The I/O module provides a data exchange format towards the core broadcast function that is independent from the data exchange format inside the network. The I/O module "abstracts" the network from the core broadcast function. Likewise, the I/O module abstracts the processing element from the rest of the production system, i.e. the rest of the production system is unaware of the physical implementation of the processing element.

Network

A network is a data communication network that interconnects processing elements of the distributed video production system. The network is horizontally scalable allowing addition of more processing elements to the video production system for increased processing capability and/or processing power. The network is also vertically scalable to interconnect a local network with a geographically distributed network.

Network Abstraction

Network abstraction provides an interface that abstracts the physical implementation of the network by organizing the communication as an exchange of blocks, wherein each block may contain one or more images, or only parts of an image, dependent on what is the most efficient way of communicating and storing the information. Any delays introduced by the network communication are automatically taken into account in workflows to prevent the delays from impacting on the synchronicity of the video production. The network also provides for a mechanism that identifies blocks such that the core broadcast function knows which block is being processed. The network abstraction enables the deployment of the distributed video production system either as a single system with local and dedicated interconnects, a LAN set up or as a geographically distributed setup.

Orchestrator

An orchestrator is a software means for automated configuration, coordination, and management of the hardware and software of the distributed video production system. The proposed video production system comprises two kinds of orchestrators.

Workflow Orchestrator

The workflow orchestrator selects the needed processing elements based on the workflows, available processing elements and network costs. The network cost depends on the location of the processing elements, the location of the video sources and the location of the operators of the system. The network cost is to be understood in terms of latency for example by the transmission of data between processing elements that are distant from each other. An increasing latency due to data transmission corresponds to an increasing network cost.

The workflow orchestrator also defines the block size of the communicated data for a specific workflow. The block size is relevant for the communication between the processing elements included in the workflow and influences the latency inside the video production system. Finally, the workflow orchestrator configures the selected processing elements and network components.

Run Time Orchestrator

The run time orchestrator receives information about all workflows and controls the exchange of blocks between processing elements. The run time orchestrator ensures that the blocks are available for processing by controlling the receiving broadcast functionality such that it requests the block only after it is available by taking into account a network delay. This goes together with controlling the network to ensure timely arrival of the blocks. Each block arrives at the processing element when the block is needed for processing.

First Embodiment

Figure 1:
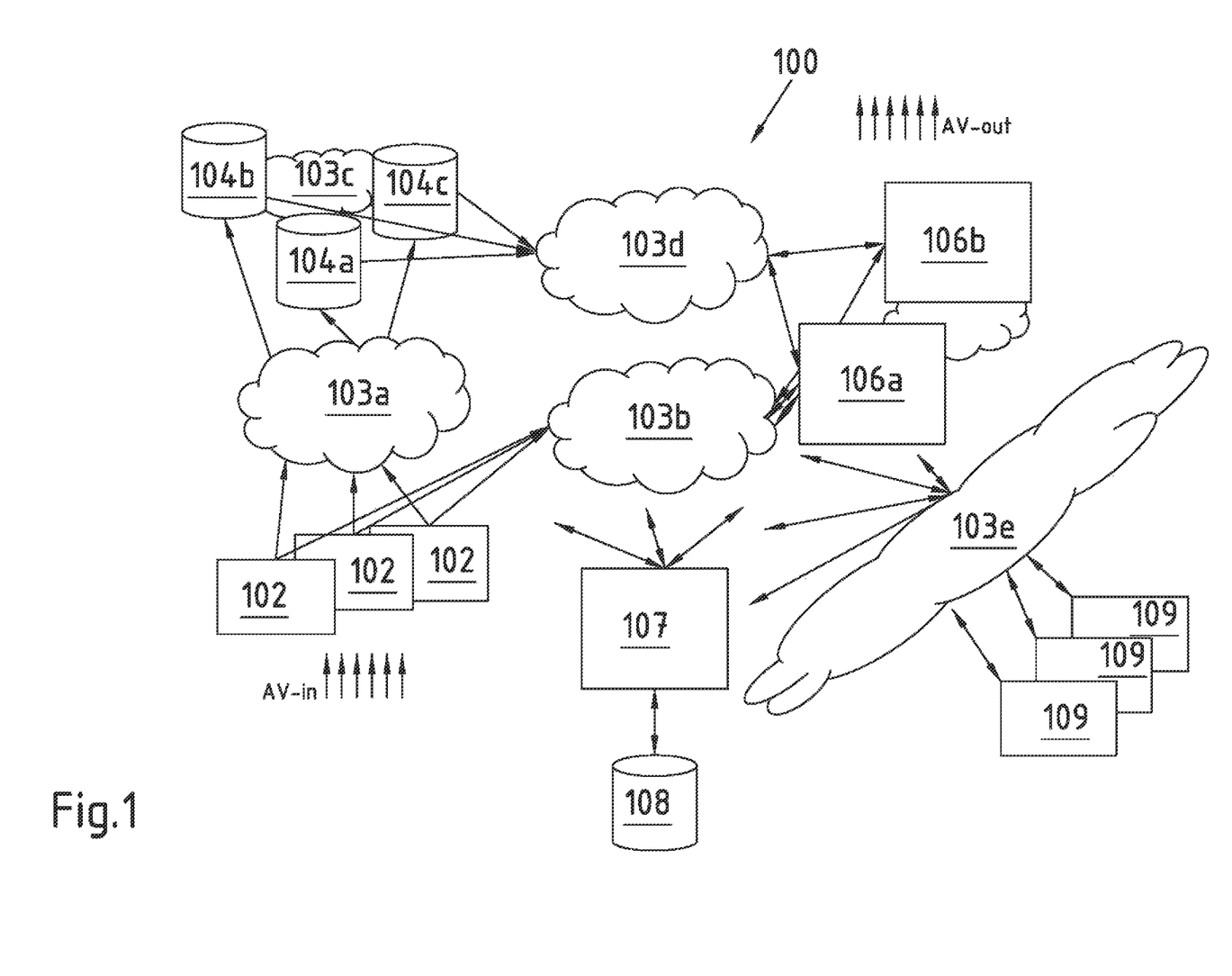
FIG. 1 a high-level overview of the architecture of the distributed video production system.

FIG. 1 illustrates a high-level overview of the architecture of the distributed video production system 100 according to the present disclosure. Audio and/or video signals AV-in, which are also referred to as audio and/or video streams, NV content or AV-feeds, are received from NV content sources such as cameras and microphones (not shown in FIG. 1) at input devices 102 which contain ingest modules performing signal conditioning and encoding modules performing signal encoding. In some embodiments, the AV content is not encoded prior to its transmission. In some embodiments the video and/or audio feeds are combined with associated meta-data, for instance video/audio meta-data or meta-data associated with the event that is captured, such as the speed of athletes or situational data being supplied by experts, e.g. commentaries on sports games like goals, fouls, etc. If such meta-data are present, the meta-data are processed together with the video and/or audio data.

The input devices 102 are located at the same or different locations within the distributed video production system 100 and are interconnected among each other and the video production system 100 as a whole by networks 103a, 103b.

A/V content, video and/or audio streams as well as video and/or audio data are used synonymously. For the sake of brevity, the term "audio" is omitted, and the description simply refers to video streams and video data. It is assumed that most video streams are accompanied with a corresponding audio stream that is processed accordingly, even if it not explicitly mentioned in the description. The same applies for meta-data, even if it not explicitly mentioned in the description, it is assumed that the meta-data are processed jointly with the video and/or audio data.

The network 103a connects storage devices 104a-104c for storing the AV content for later use. The storage devices are interconnected with each other by a network 103c. The storage devices form a database containing AV content assets.

The video production system comprises modules for signal decoding, manipulation (providing mixing and/or effects on the AV content) and play out of a program stream. These modules are implemented on different physical computing devices operating as processing devices 106a, 106b. The program stream is indicated in FIG. 1 as AV-out. However, in some embodiments, input devices 102 and processing devices 106a, 106b are hosted on the same physical server.

A network 103d connects the storage devices 104a-104c with processing device is 106a, 106b.

An asset management device 107 keeps track of all AV assets, e.g., stored audio and/or video streams, that are available within the video production system. The asset management device 107 is interconnected with all other devices within the system, for instance via the network 103b. Additionally, the asset management device 107 is connected with a database 108 containing AV assets, for instance from previous productions.

Input devices 102, storage devices 104a-104c, processing devices 106a, 106b and asset management device 107 are implemented as standalone hardware devices or, preferably, are software based, wherein the software is executed on one or several video production servers. For instance, and with reference to FIG. 1, one video production server hosts the input devices and another one the processing devices. In another embodiment the one or several video production server host(s) input and processing devices 102, 106a, 106 at the same time. Since the devices in the video production system are software based, the implementation is fully flexible and can be adapted to the needs of a specific video production. Preferably, the asset management device 107 is located and hosted to obtain the smallest delays for the access to stored video assets.

The video production system 100 comprises a graphical user interface (GUI) 109 for each operator working on a broadcast production using the video production system. I.e. there are as many GUIs 109 as operators. All GUIs are connected by a network 103e and hence the one or several GUI(s) 109 do not have to be at the same location as any other device of the video production system. Each GUI enables an operator to set-up and execute also remote workflows.

The entirety of the communication networks 100a-103e may be implemented as a plurality of separate networks that may even use different data exchange formats. But the networks may also form a single unified network. An intermediate form of both concepts is also possible, i.e. portions of the entire network are unified and some other portions remain separate networks.

In general, the use of networks introduces delays between sender and receiver that are sometimes variable, and which may be large compared to the video framerate that is for instance 50 Hz corresponding to one image frame every 20 ms. How large the delays are and to which extent they are variable depends on the network. Therefore, distributed video production systems contain buffers at one or more steps in a processing chain. The processing chain is formed by a sequence of processing elements that process video streams in a workflow. The buffers are used to store data and ensure that the data are available when the processing element needs the data for processing to implement a basic broadcast function that is contained in a workflow for a broadcast production.

Another aspect that is critical in live productions is latency, or speed of execution, and must be taken into account, too. A convenient way to solve the problem of latencies in a processing chain is to run each processing element in a processing pipeline at maximum speed upon arrival of the input data and store the results in the buffers referred to in the previous paragraph. The subsequent processing elements in the processing pipeline then consume the information.

Figure 2:
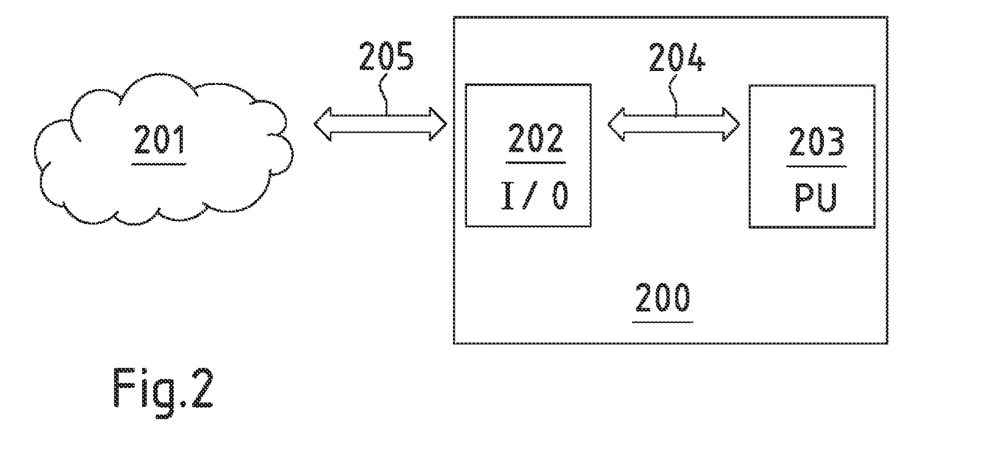
FIG. 2 schematic diagram of data communication between a processing element and a network.

FIG. 2 illustrates the data communication between a processing element 200 and a network 201. The processing element comprises an I/O module 202 and a processing unit 203 executing a software program for implementing a core broadcast function. The processing unit 203 receives input data and sends output data in an internal data exchange format to the I/O module 202. The internal data exchange is shown as double-headed arrow 204. The internal data exchange format is independent from the external data exchange format that is used for communication between the network 201 and the I/O module 202. The external data exchange between the network 201 and the I/O module 202 is shown by a double-headed arrow 205. Every I/O module 202 also includes a buffer storage.

In a processing element 200, which is set up as an ingest module, each incoming video frame of an input video stream is time stamped to enable synchronization between the input video streams and output video streams.

Video processing requires synchronization that is achieved in traditional video production systems by a common synchronization signal known as GENLOCK. Incoming video and/or audio frames must therefore be processed internally within a fixed time interval, leading to a worst-case dimensioning of the infrastructure because all processing steps must be finalized before the next frame arrives. The video production server known from EP 3 232 667 A1 utilizes asynchronous internal processing to achieve more flexibility in the dimensioning of the system and utilizing the hardware resources more efficiently. In the latter video production server known from EP 3 232 667 A1, the images are identified by a timestamp which allows processing in the right order and which allows the housekeeping of the buffer.

This approach consumes memory which, depending on the implementation, is a scarce resource. In case of scarce memory implementations, the buffering needs to be limited, and ideally be reduced.

The present disclosure proposes an approach to reduce the required buffer capacity or intermediate storage. Firstly, the problem of variation of transmission or transfer time related to the transmission of data blocks is addressed. Most of the variation can be reduced by making the network congestion-free and by flattening the transmission profile of the senders to avoid bursts. These conditions are achieved in e.g. SDTI based networks and in SDN-managed ST2110 based networks. Other implementations are equally possible. Because the images arrive synchronously in the system, and because the live production requires a synchronous stream of outgoing images, the use of the above-mentioned techniques significantly limits the transmission or transfer delay variation.

Figure 3:
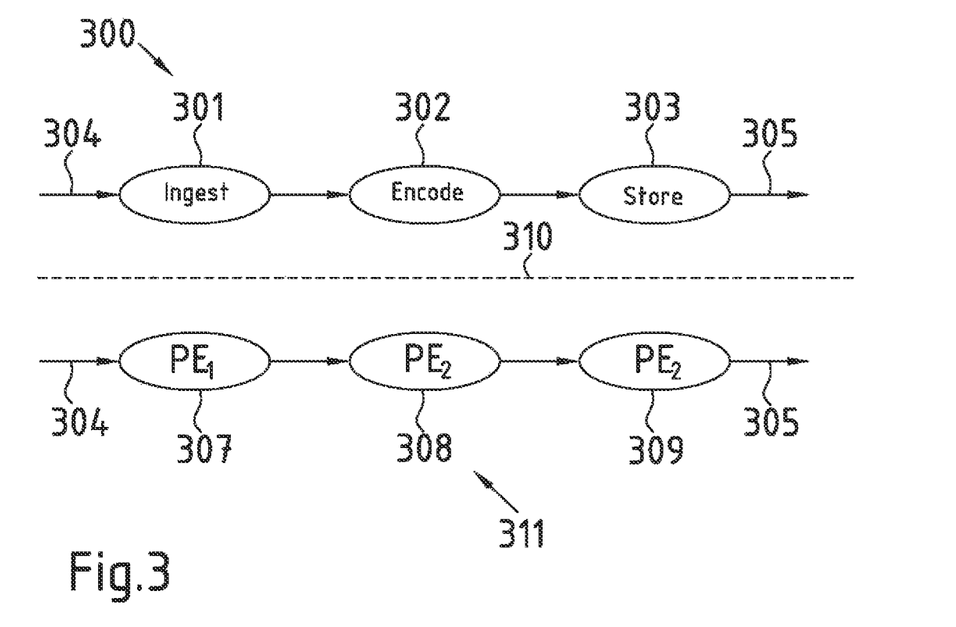
FIG. 3 a simple workflow.

FIG. 3 shows a very simple workflow 300 composed of three core broadcast functions, namely ingest 301, encode 302 and store 303. In general, a workflow can comprise fewer or more core broadcast functions. But each workflow consists on the physical layer of a concatenation of processing elements that execute a part of the workflow prior to transferring the processed data to the next processing element until the workflow is finished. Incoming video frames are indicated by an arrow 304 and outgoing video frames by an arrow 305. In between the video frames are transferred from ingest to encode and store core broadcast functions 301-303. The core broadcast functions 301-303 represent the logical level of the workflow 300 but obviously there is also a hardware level of the workflow 300 that are the processing elements 307-309 on which the core broadcast functions 301-303 are mapped. In FIG. 3 the logical level and the hardware level are separated by a dashed line 310. On the logical level in the upper half of FIG. 3 the workflow 300 is shown. On the hardware level in the lower half of FIG. 3 a processing pipeline 311 comprising the processing elements 307-309 is shown. The processing elements have a unified interface enabling an easy configuration and reconfiguration of the processing pipeline 311. The operator of the video production system only works on the logical level e.g. by adding, modifying and/or removing core broadcast functions from the workflow 300. The operator is not burdened with any kind of consideration of the underlying hardware. However, this requires that for each processing element the data to be processed is available when it is needed. Transfer delay variations make buffers necessary to ensure that the receiving processing element has the necessary data to perform the corresponding core broadcast function. The receiving processing element can consume the data that is already in the buffer. This is obtained by a run time orchestrator which is a software program running on one of the servers controlling the data transmission and processing inside the video processing system. In one embodiment the run time orchestrator is hosted on the video production server hosting one or multiple processing devices. As it will be explained further below the data are transmitted not necessarily frame by frame, but in blocks containing one or a plurality of frames.

In FIG. 3 only one workflow 300 is shown. In practice, the video processing system can host a plurality of workflows that may be operated by a single or a plurality of users at the same time. Therefore, the run time orchestrator receives information about all workflows and controls the exchange of blocks between processing elements. The run time orchestrator takes into account processing latencies and transmission delays to achieve that every block arrives at a processing element in the workflow when the block is needed for processing.

Figure 4:
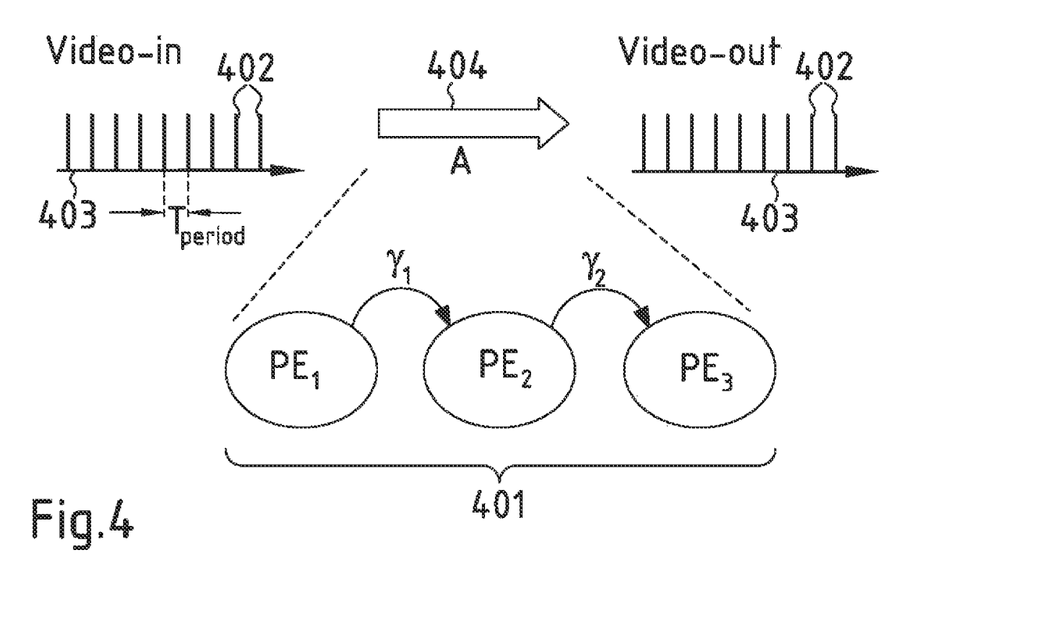
FIG. 4 signal flow and processing times of a workflow.

FIG. 4 schematically illustrates a signal flow and corresponding processing times of a simple workflow that is composed of three core broadcast functions. The core broadcast functions are for example ingesting, performing an M/E function, and encoding. The core broadcast functions are mapped on three processing elements $PE_1$, $PE_2$ and $PE_3$ forming a processing pipeline 401.

The workflow receives a video stream "video-in" as an input which is processed along the workflow to generate a video output that is indicated as "video out". The input and output video streams are symbolized by vertical bars 402 on a horizontal timeline 403. Each bar 402 stands for a full image $I_{in}$ and $I_{out}$, respectively. For instance, $PE_1$ relates to ingesting a video stream, $PE_2$ relates to reframing the video stream and $PE_3$ relates to compressing the video stream. Reframing is used for instance when a sport event is covered by a broadcast program and includes selecting a portion of an image that contains the region of interest while other parts of the image are discarded.

The processing of the input video stream as a whole is symbolized by an arrow 404 pointing from the video input stream to the video output stream. The video input stream contains one full image $I_{in}$ per time period $T_{period}$. It is assumed that $PE_1$ receives the first image of the video stream at time t=0, then it receives every $t_i=i\times T_{period}$ another full image of the video input stream, wherein i=1, 2, 3, . . . . Further, in live video production it is required that the output video stream has the same image frequency as the input video stream, i.e. the output video stream contains one full image every time period $T_{period}$, too. Since the processing of the input video stream and the transfer from $PE_1$ to $PE_2$ and then to $PE_3$ also takes time, the sequence of the images of the output video stream is shifted by an overall latency A compared to the image sequence of the input video stream. Specifically, if the $n^{th}$ image of the video input stream is received at $t(n)=n\times T_{period}$ then the video output stream is outputted at $T(n)=n\times T_{period}+A$.

The processing times in each processing element $PE_n$ are labeled $TPE_n$. The processing time depends to a certain degree on the contents of the image. For the sake of explanation, it is assumed a longitudinal object flies from the left to right through the viewing field of the camera. At first, only a small part of the object is visible in the camera image and then more and more of the object, until the object has left the camera image again on the right-hand side. The processing time for encoding such a sequence of images, $I_i$ varies a bit. The variation of the processing time is expressed as $\Delta t_{n,i}$ for each processing element $PE_n$. Specifically, the latency between the entry of image $I_i$ into processing element $PE_n$ and the exit at the output of processing element $PE_n$ is $TPE_n+\Delta t_{n,i}$.

In addition to the processing time, there is a network transfer time $\lambda_1$ and $\lambda_2$ involved for transferring the video images from processing element $PE_1$ to $PE_2$ and from processing element $PE_2$ to processing element $PE_3$, respectively. Furthermore, a certain amount of network jitter is unavoidable. Therefore, the network transfer times may vary between images which is expressed by an index i. The amount of jitter is described as $\Delta\lambda_{1,i}$ and $\Delta\lambda_{2,i}$, respectively. Hence, the effective times for transferring the video images from processing element $PE_1$ to $PE_2$ and from processing element $PE_2$ to processing element $PE_3$, are $\lambda_1+\Delta\lambda_{1,i}$ and $\Delta_{2,i}+\Delta\lambda_{2,i}$, respectively.

The overall latency A describing the delay between the entry of an image $I_i$ into the input of $PE_1$ and the exit of the same image at the output of $PE_3$ can therefore be expressed as $$A=(TPE_1+\Delta t_{1,i}+\lambda_1+\Delta\lambda_{1,i})+(TPE_2+\Delta t_{2,i}+\Delta_2+\Delta\lambda_{2,i})+(TPE_3+\Delta t_{3,i}).$$

The processing times $TPE_n$ and the transfer times $\lambda_n$ are known from an initialization phase of the video processing system. The processing and transfer times are determined by the run-time orchestrator. Once determined, the processing times $TPE_n$ and the transfer times $\lambda_n$ are stored in a lookup table (LUT). Once a workflow is configured, the run time orchestrator reads out the processing times $TPE_n$ and the transfer times $\lambda_n$ associated with this particular workflow from the LUT and determines the overall latency $\tilde{A}$ without considering the variation of processing times $\Delta t_{1,i}$ and transfer times $\Delta \lambda_{1,i}$ caused by network jitter:

$$\tilde{A}=(TPE_1+\lambda_1)+(TPE_2+\lambda_2)+TPE_3$$

If a processed image frame or block from processing pipeline 401 is needed as an input in another processing pipeline at a time $T_0$ then the run time orchestrator ensures that an input image frame or block is entered into the processing pipeline at a time instant $T_0-\tilde{A}$.

The synchronicity of the video image streams and congestion free network design with small jitter limits the variation of the network transfer times and the variation of the processing times to low values. The jitter remains in the order of milliseconds. A small amount of jitter and variation of processing times in conjunction with knowing the overall latency $\tilde{A}$ allows for small buffer needs in each of the processing elements. In most cases a buffer size for storing one or two frames is sufficient.

For live video productions it is important that the latency remains as small as possible. In a distributed video production system, the transmission of data blocks between distributed processing elements make a significant contribution to the latency. Therefore, it is important to properly implement the transmission of the data blocks to limit the latency.

Video processing in a distributed video processing system inherently involves transferring images from a storage location on a storage device to a processing element where the images are processed. The storage device is implemented for instance as a hard disk drive, an array of hard disk drives, a RAID array, as solid-state disks or as a cloud storage, to name only a few possible implementations. As it has been discussed above with reference to FIG. 4, the transfer of the images contributes to the overall latency of a workflow. The way how the transfer of the images is organized has a significant impact on the performance of the video production system. More specifically, it is important how a continuous stream of images is divided into blocks that are transferred from a storage device to a processing element or inside a network. The blocks are considered as inseparable units. Each block is transferred from a storage device or inside the network individually. The transfer time of a block is composed of an initialization time to initiate the transfer and a transmission time for transmitting the block. In a hard disk drive the initialization time corresponds to the seek time and for a network transfer the initialization time corresponds to the time needed to set up the routes in the network. The transmission time in a hard disk drive is determined by the size of the blocks and the continuous read/write speed of the hard disk drive. For a network, the transmission time is determined by the size of the blocks and the data rate of the network. The initialization time and transmission time are two different components contributing to the transfer time. As a result, the transfer time is a function of the size of the block, which will be explained in the following with reference to FIG. 5.

Figure 5:
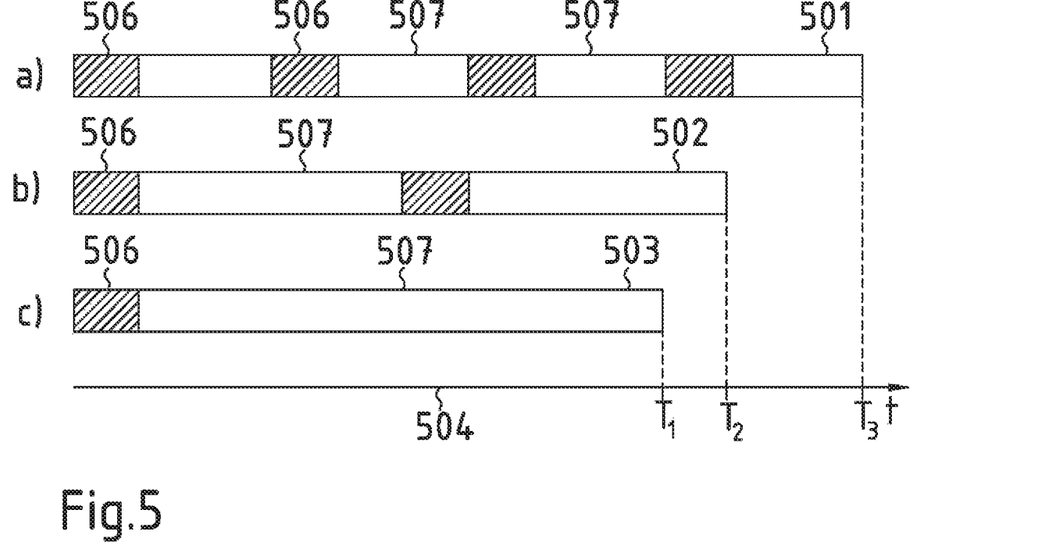
FIG. 5 a diagram to illustrate the transfer of blocks of different sizes.

FIG. 5 illustrates the transfer of blocks of different sizes as bars 501-503. The time in FIG. 5 elapses from the left to right as shown by timeline 504. Without restriction of generality, it is assumed that FIG. 5 illustrates a transfer of blocks inside the network. The initialization time is shown as a hatched area 506 and the transmission time of one block is shown as transparent area 507. The duration of the transmission time depends on the size of the blocks that are transmitted because it is also assumed that the transfer rate of the network in all three examples shown in FIGS. 5 a) to 5 c) is constant. The length of the areas 507 represents, therefore, the size of the transmitted blocks. The total transfer times are indicated as $T_1$, $T_2$ and $T_3$ on the timeline 504. As can be taken from FIG. 5 the shortest transfer time is achieved in the example shown in FIG. 5 c) having the biggest blocks. Conversely, the example shown in FIG. 5 a) requires the longest required transfer time which is associated with the smallest blocks. The transfer time $T_2$ of the example shown in FIG. 5 b) is in between transfer times $T_1$ and $T_3$. The reason for the difference between the total transfer times $T_1$, $T_2$ and $T_3$ is that in the example shown in FIG. 5 a) the network is initialized four times, in FIG. 5 b) twice and in FIG. 5 c) only once.

From FIG. 5 it can be concluded that if there is only one continuous stream that has to be transferred, read from a storage device or stored on a storage device, it would be most efficient to transfer the stream as a continuous uninterrupted stream.

In practice, a video production system handles multiple live video streams and transferring one stream continuously would block the system and bring other workflows to a standstill, which is not acceptable in live video productions.

It is therefore difficult to find a good balance between an efficient transfer of a video stream and a small latency for the video production system. The reason for this trade-off is that a block of a second stream can only be stored or transferred if the handling of a block of the first video stream has been completed. This creates an additional latency for the video production system. However, latencies must be avoided as much as possible in live productions as it has been mentioned before.

Figure 6:
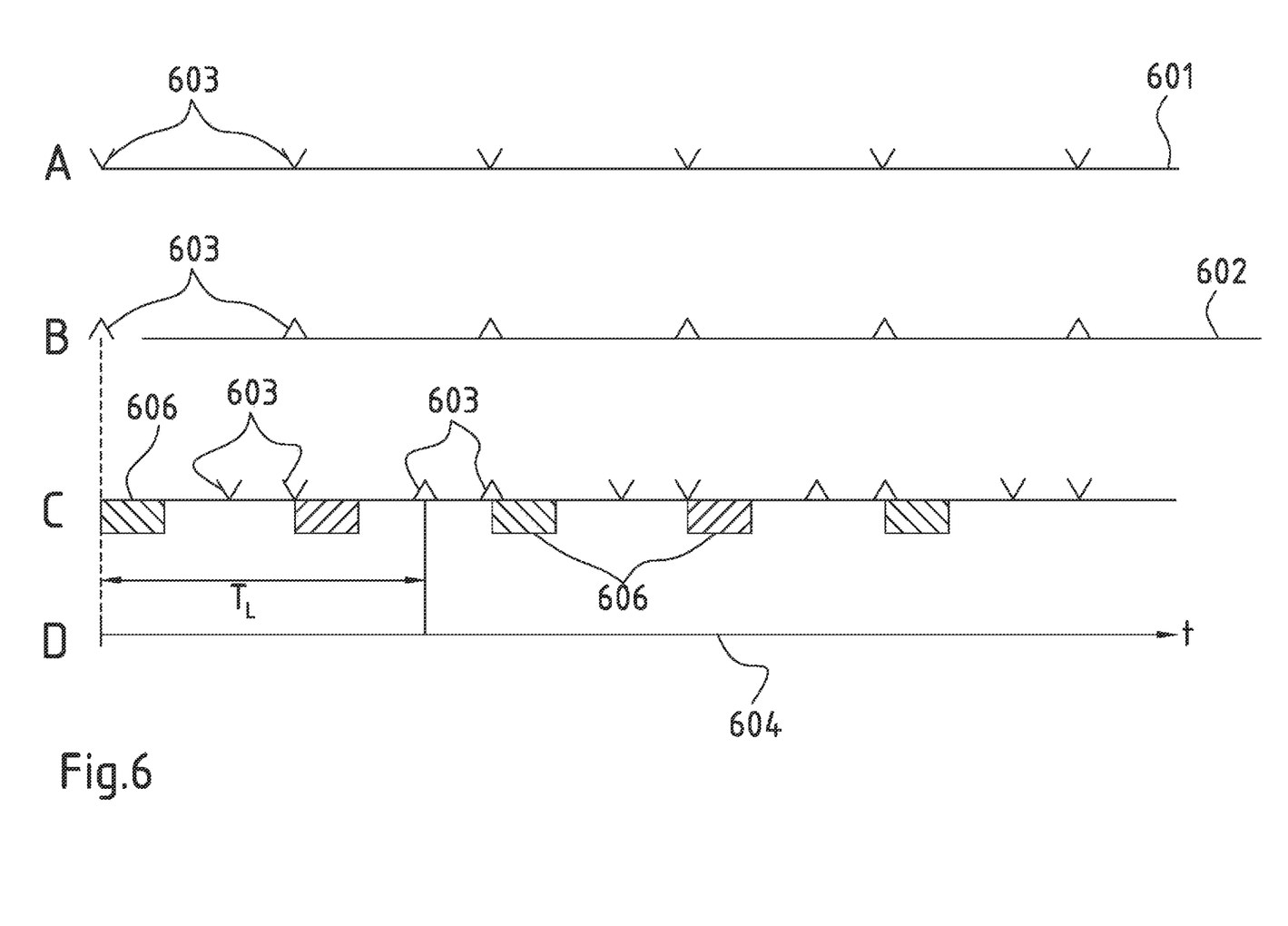
FIG. 6 a diagram illustrating latencies between different video streams.

FIG. 6 shows in lines A, B, two video streams 601, 602, which have the same bandwidth, and which are synchronized by a GENLOCK synchronization signal. Angles 603 indicate the end of an image frame. Storing of the two video streams is shown in line C. In line C the distance between the angles 603 is reduced compared to lines A, B, to visualize that the storing is performed faster than a new image of the synchronized media streams arrives. The higher speed regarding the storing is necessary to be able to store more than one video stream simultaneously. Like in FIG. 5, hatched areas 606 indicate initialization times. In line C, it is shown that at first a block of two image frames of stream 601 is stored. Once the storing of the first block of stream 601 is finished, the storing of the first block of stream 602 is initialized and then the first block of stream 602 is stored. This creates a latency $T_L$ that is graphically shown in line D. In other words: The storing of the first image frame of the second stream B is delayed by latency $T_L$ compared with the arrival of the first image frame of the second stream B in the video production system. Apparently, the latency $T_L$ increases if a bigger block size is chosen. Consequently, the block size has an impact on the performance of the video production system.

The latency $T_L$ also increases if there are more than two streams that need to be stored or transferred. In an example with three streams (not shown), the first block of the third stream can only be stored after the first blocks of the first and second stream have been stored.

A workflow orchestrator determines the block size such that a good compromise is found between the number of video streams that need to be continuously read or written and a maximum acceptable latency. The workflow orchestrator is a software program running on one of the servers inside the video processing system. In one embodiment the workflow orchestrator is hosted on the video production server hosting one or multiple processing devices. Furthermore, there are so-called variable accesses to the stored media streams, e.g. a selection of a few images at a specific time point, the selection of one out of every n images of a video stream, the selection of a section of images, etc. are read from a storage.

For a multi-viewer application, a minimum latency is highly desirable, and the block contains only a single line. In other applications the user of the video production system defines an acceptable magnitude of the latency.

In one embodiment of the video production system its flexibility is increased by organizing the blocks as hierarchical blocks, i.e. a large block can be fetched as smaller blocks from a storage device. Conversely, the concept allows for grouping smaller blocks into one large block. This concept is particularly advantageous for example, if a video stream has been ingested when long latencies were acceptable and later it is used in a live production when latency must be kept low. Of course, the reverse is also possible, namely that the video stream is stored in small blocks. Later it is read out again in large blocks, wherein each large block contains a plurality of the original small blocks.

Figure 7:
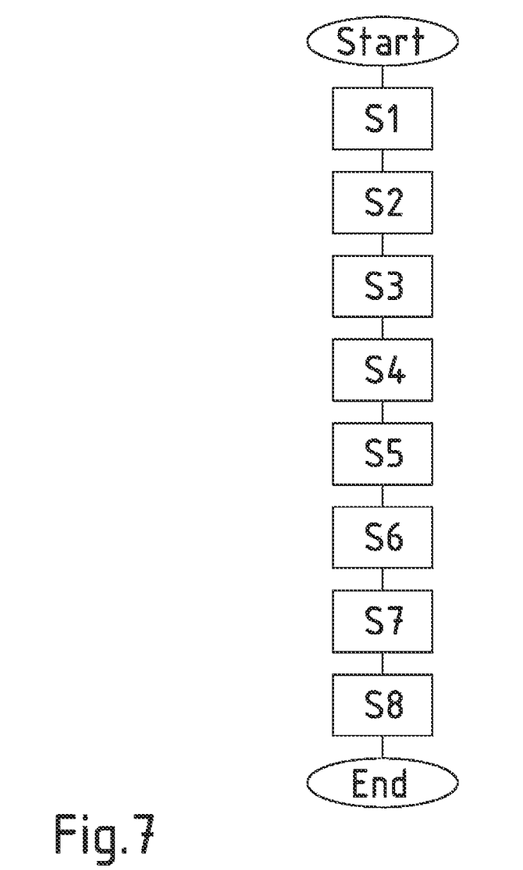
FIG. 7 a flow diagram illustrating the method according to the present disclosure.

FIG. 7 illustrates a flow diagram of the method for operating the distributed video production system. In a first step S1 the video production system receives input video streams from video sources. In step S2 timestamps are assigned to each video frame of every input video stream. In step S3 a workflow 300 is defined, which comprises a concatenation of core broadcast functions for processing video streams. In step S4 each core broadcast function 301-303 is mapped on a processing element 200 within the video production system 100. In step S5 a size of data blocks for transmission of video streams within the video production system is determined. The data blocks contain video data and are transmitted to the processing elements associated with the workflow. In step S6 processing times TPE of data blocks in each processing element associated with the workflow and transfer times λ of data blocks are determined. The transfer times λ relate to the transmission of data blocks between processing elements 200 when executing the workflow 300. In step 7 the input video streams are transferred in blocks of data to processing elements within the distributed video production system 100. Finally, the processing elements are synchronized in step S8 to ensure that a data block is available for a receiving processing element when it is needed to perform synchronized processing between input video streams and at least one output video stream. In the distributed video production system 100 each processing element performs a core broadcast function.

The method proposed according to the present disclosure obtains a synchronization of video streams and workflows in a distributed video processing system.

As long as there are no changes or modifications of the workflows executed by the distributed video processing system only steps S1 and S2 are performed and all other steps are skipped. As soon as at least one workflow is changed or modified all steps S1 to S8 are executed again. The reason is that if one workflow has been changed it may have an impact on the entire video processing system in terms of processing and/or transmission times.

Reference Signs List

| | |
|---|---|
| 100 | Distributed video production system |
| 102 | Input devices |
| 103a,b | Networks |
| 104a-c | Storage devices |
| 106a,b | Processing devices |
| 107 | Asset management device |
| 108 | Database |
| 109 | Graphical user interface |
| 200 | Processing element |
| 201 | Network |
| 202 | I/O module |
| 203 | Processing unit |
| 204 | Double-headed arrow |
| 205 | Double-headed arrow |
| 300 | Workflow |
| 301 | Ingest |
| 302 | Encode |
| 303 | Store |
| 304 | Arrow |
| 305 | Arrow |
| 307-309 | Processing elements |
| 310 | Dashed line |
| 311 | Processing chain |
| 401 | Processing pipeline |
| 402 | bar |
| 403 | Timeline |
| 404 | Arrow |
| 501-503 | bar |
| 504 | Timeline |
| 506 | Initialization time |
| 507 | Transmission time |
| 601-602 | Video streams |
| 603 | Angles |

The invention claimed is:

1. A method for operating a distributed video production system, the method comprising:
   receiving input video streams from video sources;
   assigning a timestamp to each video frame of every input video stream;
   defining a workflow comprising a concatenation of core broadcast functions for processing video streams;
   mapping each core broadcast function on a processing element within the video production system;
   determining a size of data blocks for transmission of video streams within the video production system to the processing elements associated with the workflow, wherein the data blocks contain video data;
   determining processing times of data blocks in each processing element associated with the workflow and transfer times of data blocks between processing elements when executing the workflow;
   transferring the input video streams in blocks of data to processing elements within the distributed video production system;
   synchronizing the processing elements to ensure that a data block is available for a receiving processing element when it is needed to perform synchronized processing between input video streams and at least one output video stream, wherein each processing element performs a core broadcast function; and
   receiving a user input defining an upper limit for an overall latency of the workflow and a number of transferable video streams within the workflow for determining the size of the data blocks.

2. The method according to claim 1, wherein the method further comprises:
   adapting the size of the data blocks includes limiting occupation of transfer resources by ongoing transfers of other video streams.

3. The method according to claim 1, wherein the method further comprises:
   storing the determined processing times and transfer times in a memory.

4. The method according to claim 1, wherein the method further comprises;
   assembling several small data blocks into a bigger hierarchical data block.

5. The method according to claim 4, wherein the method further comprises:
   processing the small data blocks of a hierarchical data block individually.

6. A distributed video production system comprising:
   at least one video production server hosting a plurality of processing elements, wherein each processing element is configurable to execute a core broadcast function;
   an input device for receiving input video streams, wherein the input device comprises an ingest module for assigning time stamps to each incoming data frame of the input video streams;
   a user interface enabling a user to compose a workflow comprising a concatenation of core broadcast functions, wherein each core broadcast function is mapped on one processing element, and to define an upper limit for an overall latency of the workflow and a number of transferable video streams within the workflow for determining the size of the data blocks;
   a workflow orchestrator determining a size of data blocks for transmission of video streams within the video production system to the processing elements associated with the workflow, wherein the data blocks contain video data;
   a run-time orchestrator for determining processing times of data blocks in each processing element associated with the workflow and transfer times of data blocks between processing elements when executing the workflow; wherein
   the run time orchestrator synchronizes the processing elements to ensure that a data block is available for a receiving processing element when it is needed to perform synchronized processing between input video streams and at least one output video stream, wherein each processing element performs a core broadcast function.

7. The distributed video production system according to claim 6, further comprising an asset management device enabling access to stored video streams.

8. The distributed video production system according to claim 6, further comprising a memory for storing processing times and transfer times associated with the workflow.

9. The distributed video production system according to claim 6, further comprising a plurality user interfaces for a plurality of users.

10. The distributed video production system according to claim 6, wherein the processing elements are provided with a unified interface.

11. The distributed video production system according to claim 6, wherein the user interface is a graphical user interface.

12. The distributed video production system according to claim 6, wherein the run-time and/or workflow orchestrator are hosted on one or several video production servers in the distributed video production system.

* * * * *

UNITED STATES PATENT AND TRADEMARK OFFICE
CERTIFICATE OF CORRECTION

PATENT NO. : 11,622,161 B2
APPLICATION NO. : 17/359880
DATED : April 4, 2023
INVENTOR(S) : Michel Counson Page 1 of 1

It is certified that error appears in the above-identified patent and that said Letters Patent is hereby corrected as shown below:

In the Specification

Column 10, Line 63, in a part of the formula for A, replace "$(TPE_2 + \Delta t_{2,i} + \Delta_2 + \Delta\lambda_{2,i})$" with "$(TPE_2 + \Delta t_{2,i} + \lambda_2 + \lambda_{2,i})$".

Signed and Sealed this
Twentieth Day of June, 2023

Katherine Kelly Vidal
*Director of the United States Patent and Trademark Office*